(12) United States Patent
Callas et al.

(10) Patent No.: US 7,640,427 B2
(45) Date of Patent: Dec. 29, 2009

(54) SYSTEM AND METHOD FOR SECURE ELECTRONIC COMMUNICATION IN A PARTIALLY KEYLESS ENVIRONMENT

(75) Inventors: Jonathan D. Callas, San Jose, CA (US); William F. Price, III, Los Altos, CA (US); David E. Allen, Sunnyvale, CA (US)

(73) Assignee: PGP Corporation, Palo Alto, CA (US)

( * ) Notice: Subject to any disclaimer, the term of this patent is extended or adjusted under 35 U.S.C. 154(b) by 565 days.

(21) Appl. No.: 10/462,618

(22) Filed: Jun. 17, 2003

(65) Prior Publication Data

US 2004/0133775 A1    Jul. 8, 2004

Related U.S. Application Data

(60) Provisional application No. 60/438,302, filed on Jan. 7, 2003.

(51) Int. Cl.
  *H04L 9/00* (2006.01)
  *H04L 9/30* (2006.01)
  *G06F 15/16* (2006.01)

(52) U.S. Cl. .................. 713/153; 713/155; 713/156; 713/157; 713/158; 380/30; 380/277; 709/224; 709/225; 709/226; 709/227; 709/228

(58) Field of Classification Search ......... 713/150–158, 713/170, 173; 709/223–230; 380/283–285, 380/286, 30; 705/76, 44
  See application file for complete search history.

(56) References Cited

U.S. PATENT DOCUMENTS 5,261,002 A    11/1993    Perlman et al.

(Continued)

FOREIGN PATENT DOCUMENTS

WO    02/17578 A    2/2002

OTHER PUBLICATIONS

Microsoft Press Computer Dictionary, Third Edition, 1997, Microsoft Press, pp. 20.

(Continued)

*Primary Examiner*—Longbit Chai
(74) *Attorney, Agent, or Firm*—Cooley Godward Kronish LLP

(57) ABSTRACT

This present invention provides users with secure transparent electronic communication, allowing them to send and receive encrypted and/or signed messages with little or no user involvement. In various embodiments, the present invention provides a user with e-mail security via automated hierarchical techniques for transparently sending and receiving secure messages, and lowers the burden on administrators. Such a system can also manage cryptographic keys and certificates for the users, and creates such keys and certificates for the users when necessary. A server according to the present invention can intercept unsecured messages from a user, automatically transform those messages into secured messages, and transmit those secure messages to the intended recipients. The server can also automatically transform messages after the recipient sends a digital identity to the server and downloads the software necessary for transforming the secured messages back into readable messages (i.e., from ciphertext into plaintext). The server can further intercept an unsecured message from a user, search for a digital identity of the intended recipient, secure the unsecured message upon finding such a digital identity, and transparently send the secured message to the intended recipient.

2 Claims, 7 Drawing Sheets

U.S. PATENT DOCUMENTS

| | | |
|---|---|---|
| 5,671,279 A | 9/1997 | Elgamal |
| 5,745,574 A | 4/1998 | Muftic |
| 5,799,086 A * | 8/1998 | Sudia .......................... 705/76 |
| 5,982,898 A | 11/1999 | Hsu et al. |
| 6,023,700 A | 2/2000 | Owens et al. |
| 6,067,620 A | 5/2000 | Holden et al. |
| 6,134,658 A | 10/2000 | Multerer et al. |
| 6,233,577 B1 | 5/2001 | Ramasubramani et al. |
| 6,249,585 B1 | 6/2001 | McGrew et al. |
| 6,301,658 B1 * | 10/2001 | Koehler ...................... 713/155 |
| 6,356,937 B1 | 3/2002 | Montville et al. |
| 6,442,686 B1 | 8/2002 | McArdle et al. |
| 6,499,108 B1 | 12/2002 | Johnson |
| 6,609,196 B1 | 8/2003 | Dickinson et al. |
| 6,636,975 B1 | 10/2003 | Khidekel et al. |
| 6,651,166 B1 | 11/2003 | Smith et al. |
| 6,684,248 B1 * | 1/2004 | Janacek et al. .............. 709/225 |
| 6,715,073 B1 | 3/2004 | An et al. |
| 6,732,101 B1 | 5/2004 | Cook |
| 6,745,231 B1 | 6/2004 | Megiddo |
| 7,032,242 B1 | 4/2006 | Grabelsky et al. |
| 7,305,545 B2 | 12/2007 | Filipi-Martin et al. |
| 2001/0034833 A1 | 10/2001 | Yagasaki et al. |
| 2002/0007453 A1 * | 1/2002 | Nemovicher ................ 713/155 |
| 2002/0035685 A1 | 3/2002 | Ono et al. |
| 2002/0052923 A1 * | 5/2002 | Anderson ................... 709/206 |
| 2002/0059144 A1 | 5/2002 | Meffert et al. |
| 2002/0144109 A1 | 10/2002 | Benantar et al. |
| 2003/0084311 A1 | 5/2003 | Merrien et al. |
| 2003/0115448 A1 | 6/2003 | Bouchard |
| 2003/0130947 A1 * | 7/2003 | Benantar ..................... 705/44 |
| 2003/0131232 A1 * | 7/2003 | Fraser et al. ................ 713/156 |
| 2003/0140223 A1 | 7/2003 | Desideri |
| 2003/0149872 A1 | 8/2003 | Harrison et al. |
| 2003/0154371 A1 | 8/2003 | Filipi-Martin et al. |
| 2004/0133520 A1 | 7/2004 | Callas et al. |
| 2004/0133774 A1 | 7/2004 | Callas et al. |
| 2004/0133775 A1 | 7/2004 | Callas et al. |

OTHER PUBLICATIONS

Homsher, "GISO Practical Assignment Version 1.2", GIAC Enterprises, Apr. 25, 2002.

Homsher, Lori, "GISO Practical Assignment Version 1.2", GIAC Enterprises, Apr. 25, 2002.

* cited by examiner

SYSTEM AND METHOD FOR SECURE ELECTRONIC COMMUNICATION IN A PARTIALLY KEYLESS ENVIRONMENT

CROSS-REFERENCE TO RELATED APPLICATIONS

This patent application claims priority to U.S. Provisional Patent Application No. 60/483,302, filed Jan. 7, 2003 and entitled "SYSTEM AND METHOD FOR SECURE ELECTRONIC COMMUNICATION IN A PARTIALLY KEYLESS ENVIRONMENT," and is related to U.S. patent application Ser. No. 10/462,775 filed Jun. 17, 2003 entitled, "SYSTEM AND METHOD FOR SECURE AND TRANSPARENT ELECTRONIC COMMUNICATION," now abandoned, and is related to U.S. patent application Ser. No. 10/462,607 filed Jun. 17, 2003 entitled SYSTEM AND METHOD FOR TRANSPARENTLY PROVIDING DYNAMIC USER REGISTRATION AND CERTIFICATE UPDATE," now abandoned, the entirety of which are incorporated herein by reference.

FIELD OF THE INVENTION

This invention relates generally to securing electronic messages in a computer network. More particularly, this invention relates to techniques for providing automated hierarchical techniques for sending and receiving secure messages without keys.

BACKGROUND OF THE INVENTION

Encryption is the process of using a cryptographic key to scramble the contents of an electronic message (i.e., the plaintext) rendering it unreadable by anyone but the holder of a corresponding key (i.e., the intended recipient), the result being an unintelligible message (i.e., the ciphertext). Decryption reverses the encryption process by converting ciphertext back to plaintext, thereby restoring the original message. Encryption and decryption can be used to provide message security. Message security, particularly electronic mail (e-mail) encryption and decryption, has seen a relatively low adoption rate amongst Internet users. Many users know that messages transmitted via open networks such as the Internet are plainly readable, yet they commonly do not use encryption to solve this problem. Furthermore, from organized studies to anecdotal evidence, many people seem to have difficulty with effectively using encryption software.

As shown in FIG. 1, a traditional secure e-mail system includes e-mail server 106 in connection with user computer 102 and an open communications network such as Internet 1000. In order to send a message securely over Internet 1000, a user usually installs encryption software 104 on user computer 102. The user is then typically required to configure various settings in encryption software 104, including such things as key lengths, algorithms, passwords, and other security related parameters.

The overarching architectural goal of secure electronic communication is to make encryption easy to use and ubiquitous. Unfortunately, security experts often view security as an "all-or-nothing" prospect. This has led to, for example, complex software, difficult to use interfaces, and poor performance. What is needed, then, is a secure, transparent electronic communication system that alleviates the need for end users to interact with encryption software.

SUMMARY OF THE INVENTION

Figure 1:
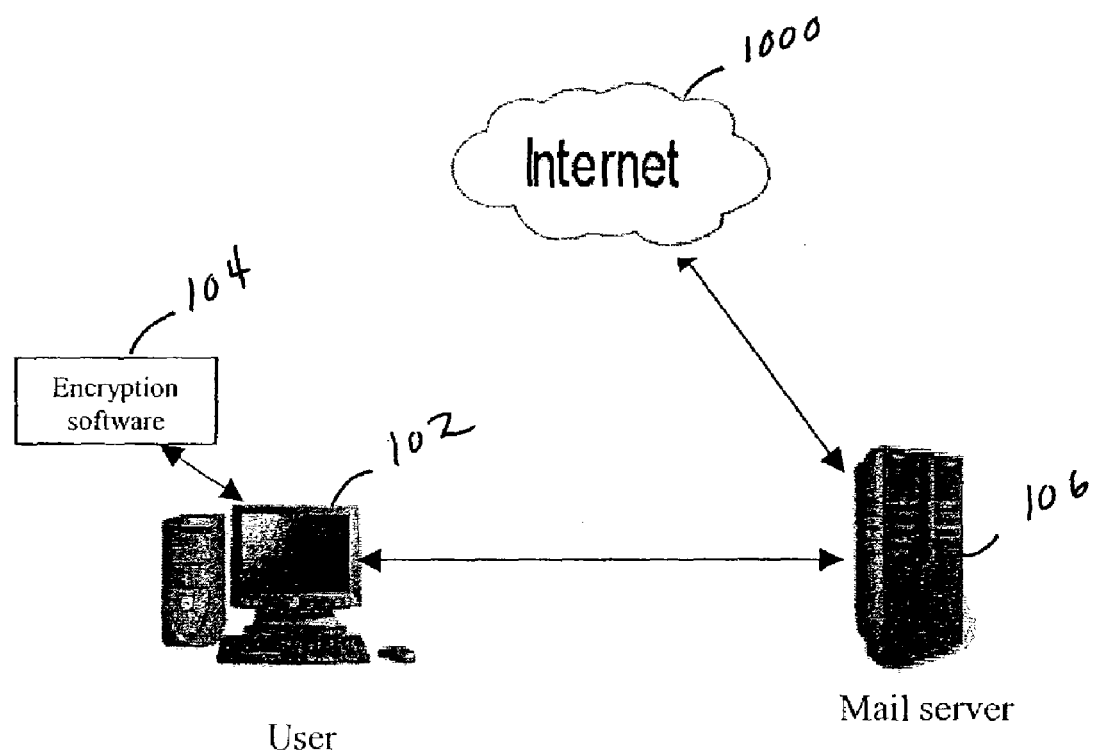
FIG. 1 depicts an encryption software package running in a network environment according to the prior art.

This invention provides secure transparent electronic communication. It allows users to send and receive encrypted and/or signed messages with little or no user involvement. In an embodiment, secure transparent electronic communication provides end-user transparency. A user does not need to know the details of security or, for example, that a session is encrypted. Instead, the secure transparent electronic communication is provided by, for example, a separate server. Consequently, secure transparent electronic communication provides a user, in one embodiment, with e-mail security via automated hierarchical techniques for transparently sending and receiving secure messages. A second feature of secure transparent electronic communication is that it lowers the burden on administrators. It focuses the software setup on a relatively few servers rather than on many clients. Also, from an administrator perspective, secure transparent electronic communication allows for a public key infrastructure (PKI) to be dynamically constructed and operated. A third feature is that it offers a scale of tradeoffs of security with ease of use. In its most refined form, secure transparent electronic communication is encryption done entirely on servers. Secure transparent electronic communication interoperates fully with client-based encryption, and provides even stronger security for users who demand such higher security. It further provides for sophisticated digital certificate searching for users that may not have cryptographic keys and certificates.

An embodiment of the present invention includes a server in a local network that acts as a proxy between a user and an open communications network, with the server intercepting messages to or from the user in the local network and transforming those messages using indicia contained within or related to the messages, thereby providing transparent transmission and receipt of secure messages for the user. In an exemplary embodiment, a system according to the present invention could be used for sending and receiving secure e-mail. In another embodiment, such a system could be used for securing instant messaging (IM). In yet another embodiment, such a system manages cryptographic keys and certificates for the users, and creates such keys and certificates for the users when necessary.

According to another aspect of the present invention, unsecured messages from a user are intercepted at a server, automatically transformed into secured messages, and transmitted to recipients. In another embodiment, the messages are automatically transformed by a server after the recipient downloads the software necessary for transforming the secured messages back into readable messages (i.e., from ciphertext into plaintext) and sends a digital identity to the server.

Similarly, another aspect of the present invention involves intercepting secured messages for a user, automatically unsecuring the message for the user, and sending the unsecured message to the user.

In yet another aspect of the present invention, a server receives an indication that a user has been properly authenticated, checks whether the user has a cryptographic key, and automatically creates a key if the user does not have one, thereby automatically registering the user within a predefined community and allowing the user to transparently send and receive secure electronic messages.

A further aspect of the present invention involves intercepting at a server an unsecured message from a user, searching for a digital identity of the intended recipient, securing said digital message upon finding such a digital identity, and transparently sending the secured message to the intended recipient.

DETAILED DESCRIPTION OF THE INVENTION

Secure transparent electronic communication is a set of strategies that offer great improvements over the prior art for end users and IT staff. Secure transparent electronic communication also provides an improved development platform, making it easier to test and perform quality assurance, thus providing a lower cost to customers. In one embodiment, no client program is installed on the user's computer. Instead, a server manages all of the secure messaging for the clients.

Figure 2:
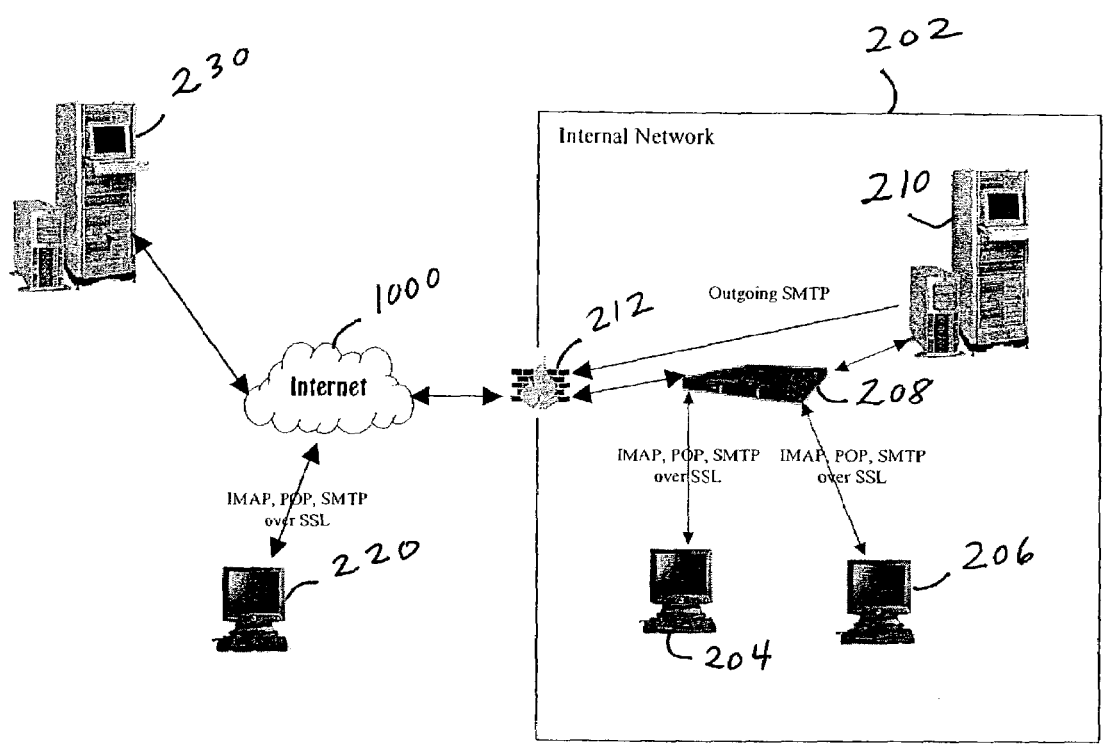
FIG. 2 illustrates a network with a server operating in proxy mode according to an embodiment of the present invention.

FIG. 2 depicts a system 200 that contains secure server 208 according to the present invention operating within internal network 202 and connected to Internet 1000 through firewall 212 (which protects internal network 202). Internal network 202 can comprise, for example, a local area network (LAN) or a wide area network (WAN). Also connected to internal network 202 are user computers 204 and 206 (also known as client computers or client machines). Secure server 208 can, for example, be an Ovid server, designed and distributed by PGP Corporation of Palo Alto, Calif. In an embodiment, secure server 208 can provide e-mail security for users of client computers 204 and 206.

Secure server 208 is transparent, meaning that to the user, the addition of secure server 208 to internal network 202 causes no perceptible change in functionality since the user's computer still sends and receives e-mail as usual. In an embodiment shown in FIG. 2, secure server 208 proxies the network protocols and manages all cryptographic operations for the clients, i.e. user computers 204 and 206. The standard and well known protocols to which security is provided by secure server 208 include, without limitation, Simple Mail Transfer Protocol (SMTP) for sending e-mail, and version 3 of the Post Office Protocol (POP3) and/or version 4 of the Internet Message Access Protocol (IMAP4) for retrieving e-mail. In addition, other protocols and functions that can be protected include, without limitation:

AOL Instant Messaging (AIM) from America On-Line, Inc.;

ICQ (a protocol for locating other users on the Internet);

Jabber, an XML-based protocol for the exchanging of messages in real-time between any two points on the Internet;

Messaging Application Program Interface (MAPI) messages, where MAPI is a Microsoft Windows programming interface that enables e-mail to be sent from within a Windows application and documents to be attached to the e-mail; and Simple Object Access Protocol (SOAP), an XML-based protocol that allows activation of applications or objects within an application across networks and computer platforms (including across the Internet).

When possible and appropriate, secure server 208 further secures these protocols with the Secure Sockets Layer (SSL) protocol, as discussed below.

As will be described in further detail below, secure server 208 proxies standard network protocols between user computers 204 and 206 and the actual e-mail server 210. As a result, user computers 204 and 206 and e-mail server 210 can use nearly any e-mail client or e-mail server. As long as user computers 204 and 206 utilize standard protocols, the secure transparent electronic communication functionality provided by secure server 208 can enable secure transparent e-mail. Secure server 208 can also be used in conjunction with other proxies that scan for viruses or hostile content.

In one embodiment, secure server 208 runs its own operating system and contains software that allows it to receive software updates from PGP Corporation. Secure server 208 may be shipped as a turnkey box (e.g., a 1U rack-mount system, or possibly a small office/home office (SOHO) computer), or as software installed on a suitably configured piece of hardware, such as personal computers from major manufacturers (e.g., Dell, HP, etc.)

Modes of Operation

Proxy Mode

FIG. 2 shows an example of a secure server operating in proxy mode according to the present invention. In this mode, secure server 208 is logically positioned between the local users of client machines 204 and 206, and e-mail server 210. Whereas a typical e-mail server communicates directly with users in the network, secure server 208 handles all communication with the local users of client machines 204 and 206. In proxy mode, client machines 204 and 206 do not interact with e-mail server 210. Specifically, secure server 208 encrypts outbound SMTP e-mail destined for Internet 1000 and decrypts local POP and IMAP e-mail.

Secure server 208 performs the encryption and decryption processes based on indicia contained within or accompanying the messages, including, without limitation, any combination of a username, distinguished name, common name, domain name, or certificate. In proxy mode, all e-mail on e-mail server 210 is stored encrypted, and is only decrypted by secure server 208 when the user of client machine 204 or 206 downloads it. In addition, secure server 208 decrypts e-mail when downloaded by remote users of local network 202 (i.e., users physically located outside local network 202, such as remote user 220). Further, outbound e-mail is optionally relayed through a separate SMTP relay (not shown in FIG. 2). Secure server 208 operates in proxy mode when the administrator configures secure server 208 to decrypt e-mail as the user downloads the messages from e-mail server 210. Proxy mode also allows secure server 208 to properly detect e-mail aliases.

More particularly and in an exemplary embodiment, secure server 208 proxies e-mail between existing e-mail server 210 and an existing e-mail client program running on a client machine 204 or 206. E-mail server 210 is also known as a Mail Transport Agent (MTA), which is the tool utilized in a network for delivering e-mail. The e-mail client program is also known as a Mail User Agent (MUA), which is the interface between the user and the MTA. Secure server 208 works with any e-mail server or client that employs standard network protocols, such as SMTP, POP3, and IMAP4. Additionally, secure server 208 supports MAPI interfaces for Microsoft Exchange servers as well as Lotus Notes. It also supports these protocols over the well known Secure Sockets Layer (SSL) protocol or the Transport Layer Security (TLS) protocol (together SSL/TLS). Typically, server 208 acts as a live proxy, meaning that it mediates the actual connection between the MUA and the MTA. At times, the server may also act as an SMTP relay, in cases where it cannot immediately process a connection.

In order to provide transparent encryption and decryption, secure server 208 manages all cryptographic keys, certificates, and processes for users. A system using secure server 208 requires no software to be placed on end user systems. When no software for providing encryption or decryption exists on the machines of end users, there would be no discernible indication to the end users that the communications are being protected. In an alternative embodiment, security software can be installed on client machines 204 and 206 to reduce some of the processing done by secure server 208.

Secure server 208 creates keys and certificates opportunistically, meaning that when it first sees a valid user connecting to e-mail server 210, it automatically and transparently creates a key and certificate for that user. It can update that key and certificate using the valid FROM address on an authenticated SMTP connection. The key database containing the keys and certificates is regularly backed up and stored on another system by FTP or by e-mail. In an embodiment, the backup database is PGP-encrypted using an administrator key.

In proxy mode, e-mail messages are stored on e-mail server 210, and encrypted and decrypted by secure server 208 upon retrieval. Secure server 208 can, according to policy, perform the encryption and decryption operations completely transparently, it can add text headers indicating that the e-mail was encrypted or signed, or it can even add in rich text with notifications. Note that secure server 208 must also parse ordinary messages to defeat spoofing.

Typically, secure server 208 does not store account names and passwords of the users of client machines 204 and 206. Rather, since secure server 208 proxies a connection on behalf of the user to another server (i.e., e-mail server 210), secure server 208 considers that connection to be authenticated if e-mail server 210 considers the connection to be authenticated.

In an exemplary embodiment, security software running on client machines 204 and 206 transparently provides traditional PGP functionality to the end user, such as file encryption and decryption, disk encryption and decryption, and secure file deletion. Furthermore, security software allows sharing of a digital certificate (also referred to as simply a certificate) between client machines 204 or 206 and secure server 208, which gives the users the benefit of certificate-based systems, while reducing the chance of data loss. The security provided by secure server 208 works for mobile user 220, as well. In one embodiment, the connection between mobile user 220 and internal network 202 is protected with SSL.

Microsoft Exchange

The Exchange product from Microsoft Corp. of Redmond, Wash. uses a proprietary protocol for client-server communication. Consequently, in one embodiment of the present invention, specific changes are needed in order to allow secure server 208 to interoperate with an Exchange-based e-mail server (which could be one type of e-mail server 210). An Exchange server plug-in (i.e., small program module) allows the messages on the Exchange-based e-mail server 210 and the messages on secure server 208 to be easily sent to and received from each other.

In operation, the Exchange plug-in running on e-mail server 210 intercepts an e-mail message and transfers it to secure server 208. Secure server 208 then performs any key lookups and message transformation. An outbound SMTP message is then sent to the recipient (which could include a user connected to a remote e-mail server 230), optionally through an SMTP relay. Messages intended for a local Exchange user are sent back to the Exchange server.

Communication between secure server 208 and an Exchange-based e-mail server 210 utilize Secure Hypertext Transmission Protocol (SHTTP). Authentication involves client-side Transport Layer Security (TLS) on both sides; that is, secure server 208 authenticates the certificate of Exchange-based e-mail server 210, and Exchange-based e-mail server 210 authenticates the certificate of secure server 208. The administrator configures secure server 208 with the TLS certificates of Exchange-based e-mail server 210, and vice-versa. Since port 443 will cause conflicts on both servers, port 444 is used as a default in one embodiment.

In cases where the communication is initiated by a user, such as through the user configuration console, secure server 208 connects to the plug-in in Exchange-based e-mail server 210 to verify the user's username and password. Since user authentication is very costly in terms of processing power, and needs to happen very frequently, when the communication comes directly from the Exchange plug-in running on Exchange-based e-mail server 210, no authentication is needed since secure server 208 trusts Exchange-based e-mail server 210 to designate what operation needs to be performed and what user needs to perform the operation. This trust exists since the TLS certificate of Exchange-based e-mail server 210 has already been authenticated.

The messages Exchange-based e-mail server 210 sends to secure server 208 do not have standard e-mail headers, so the communication also includes information such as sender and recipients. In addition, the Exchange plug-in running on Exchange-based e-mail server 210 recognizes when a message is sent to an Exchange distribution list, and signals to secure server 208 that the message should not be encrypted.

Gateway Mode

Figure 3:
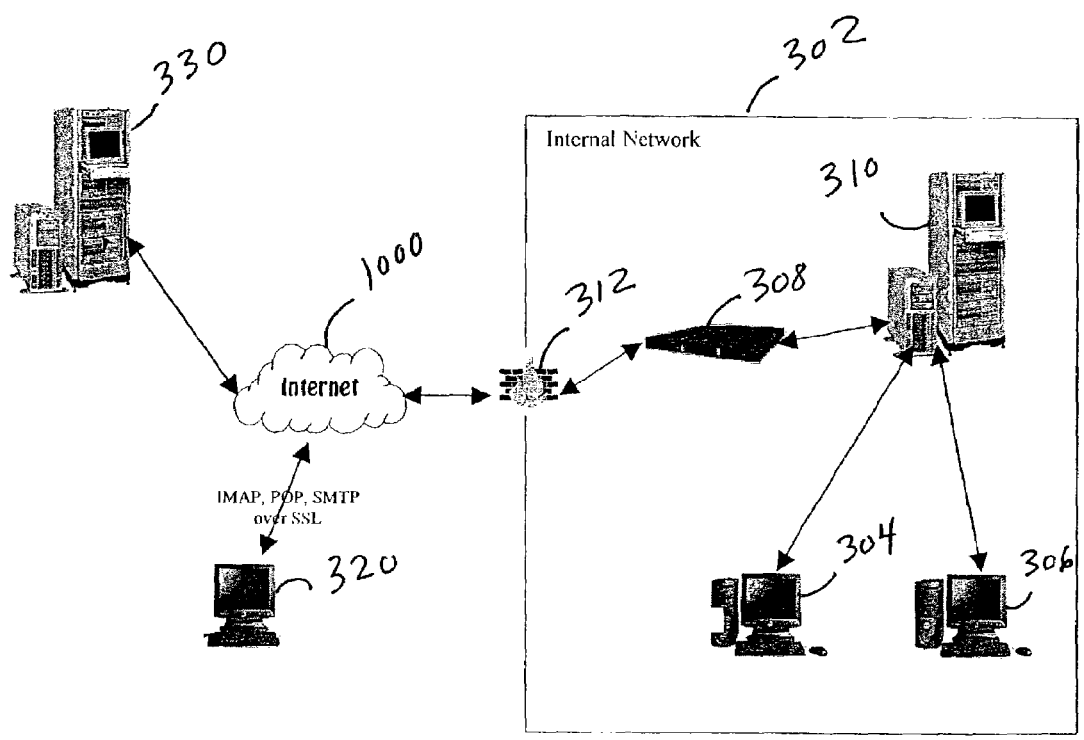
FIG. 3 illustrates a network with a server operating in gateway mode according to an alternative embodiment of the present invention.

FIG. 3 shows a typical secure server according to the present invention in gateway mode. Such an installation enables client machines 304 and 306 to connect to the secure server 308 over SSL enhanced connections. Client machines 304 and 306 are shown in FIG. 3 as being part of an internal network 302 inside the corporate firewall, which is provided by a firewall device 312. When client machines 304 and 306 send an e-mail message, the message travels through e-mail server 310, but, prior to being sent out to Internet 1000 and on to the recipients (including, for example, remote user 320 or a user connected to server 330), secure server 308 intercepts and encrypts that e-mail. When e-mail is received into the network by e-mail server 310, secure server 308 intercepts and decrypts that e-mail prior to sending on to the client machine. In this embodiment, secure server 308 performs all certificate handling as well as bulk cryptography.

In gateway mode, secure server 308 is logically positioned between e-mail server 310 and Internet 1000. E-mail server 310 handles all communication with the local users of client machines 304 and 306. The only tasks handled by secure server 308 are encrypting outbound SMTP e-mail and decrypting incoming SMTP e-mail. In this configuration, all e-mail is stored unencrypted on e-mail server 310. In addition, outbound e-mail is optionally relayed through a separate SMTP relay. Secure server 308 operates in this mode when the administrator has configured secure server 308 to decrypt e-mail as that e-mail is received.

Proxy Mode With a Supplemental Server

Figure 7:
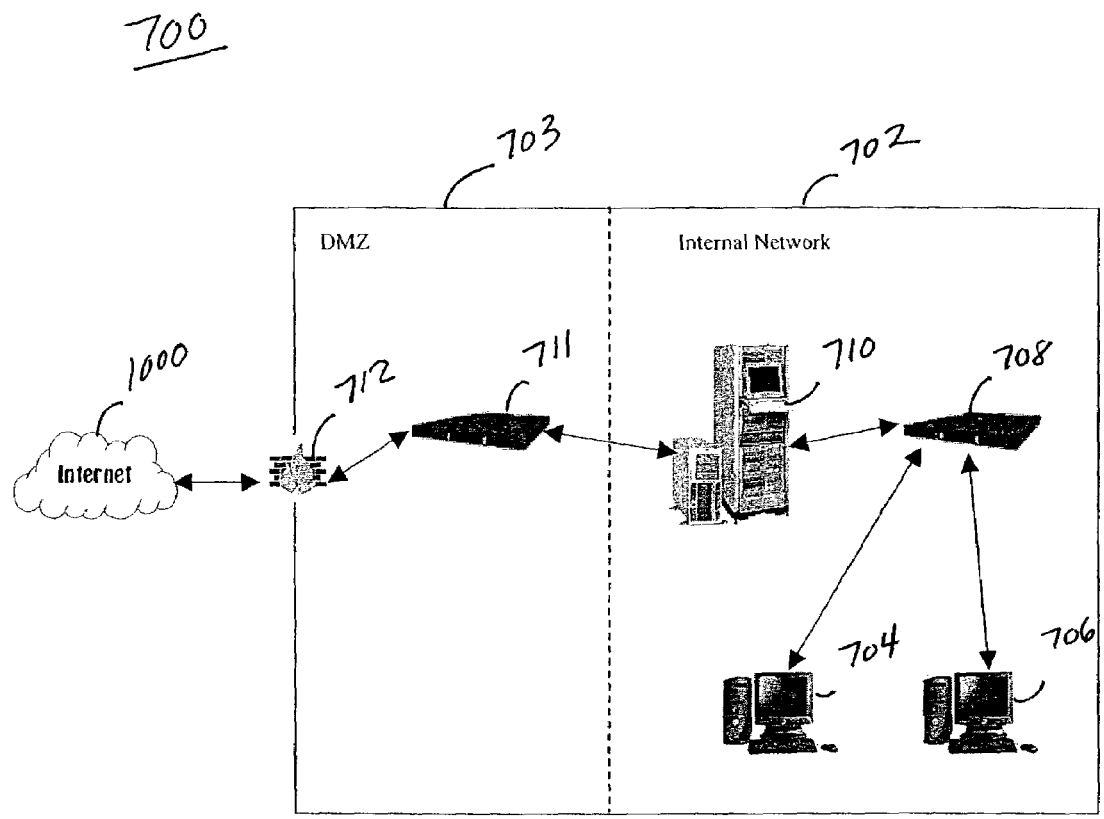
FIG. 7 is an alternative embodiment of the present invention.

FIG. 7 depicts an alternative embodiment of the present invention that includes the use of a supplemental server for providing additional capabilities to a deployed secure server in proxy mode. The system 700 shown in FIG. 7 includes internal network 702 and "demilitarized zone" (DMZ) 703. Internal network 702 includes e-mail server 710 and secure server 708 in proxy mode that, as described earlier, intercepts messages to and from client machines 704 and 706, thereby providing secure electronic communications for the users within internal network 702. DMZ 708 includes supplemental server 711 and firewall 712. Supplemental server 711 is configured to provide additional or supplemental capabilities to secure server 708. In an embodiment, supplemental server 711 can provide load balancing for secure server 708 by handling incoming requests for keys. In addition, supplemental server 711 can be configured to handle secure URL mail requests (as discussed below with respect to FIG. 5).

Communication Amongst Secure Servers and Clients

Figure 4:
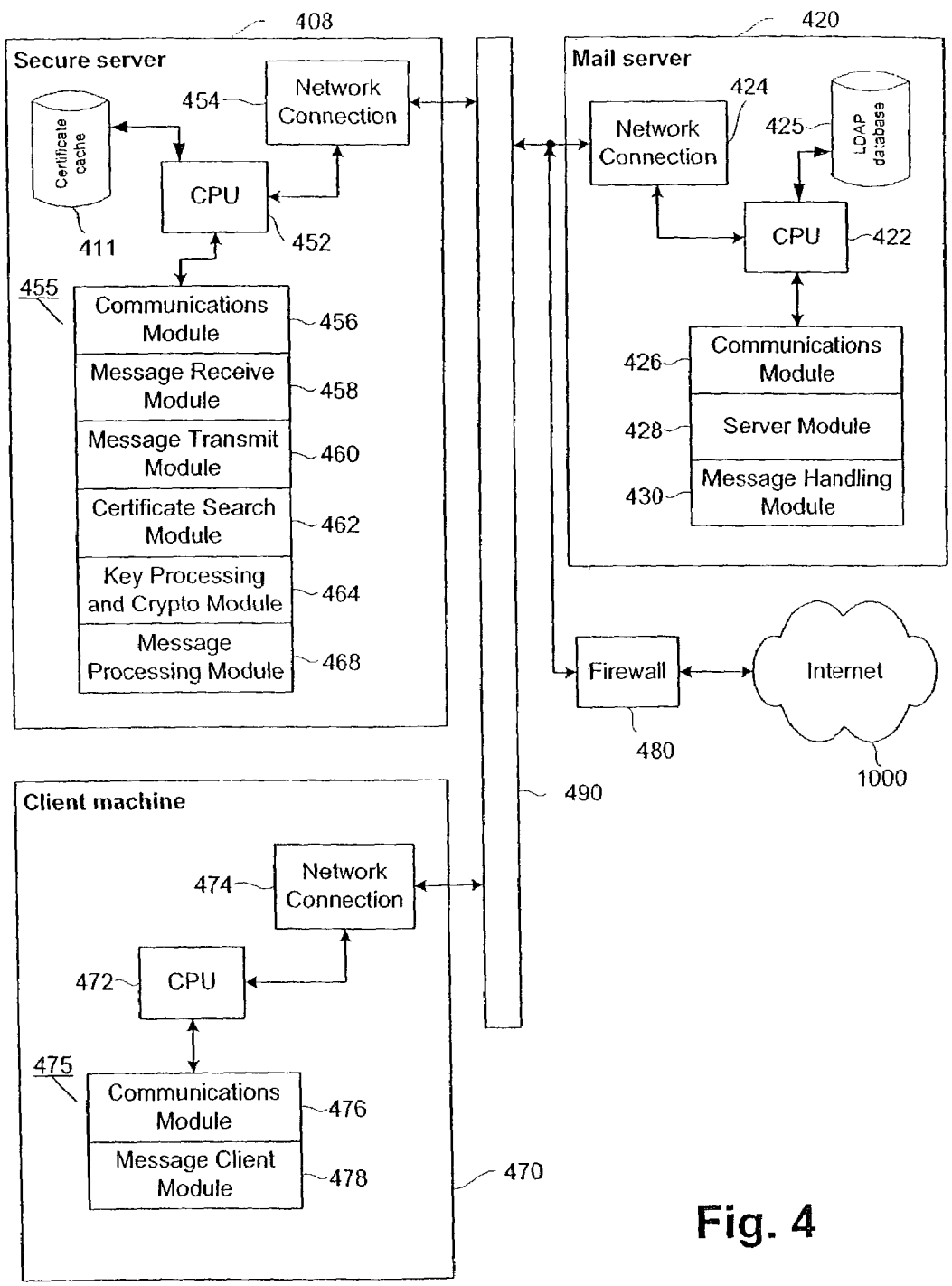
FIG. 4 is a network diagram showing the logical connection of a server that provides secure transparent electronic communication according to an embodiment of the present invention.

FIG. 4 depicts a network block diagram, with secure server 408, a client machine 470, an e-mail server 420, and a firewall 480 all communicating over local network 490. Note that in a typical embodiment, there would be many more client machines than just the single client machine 470. As described above, secure server 408 can operate in either proxy mode (by sitting logically between client machine 470 and e-mail server 420) or gateway mode (by sitting logically between e-mail server 420 and Internet 1000). As shown in FIG. 4, secure server 408 includes standard server computer components, including a network connection device 454, a central processing unit (CPU) 452, and a memory unit 455. Memory unit 455 can contain a set of computer instructions organized into modules for performing various tasks. In an exemplary embodiment, memory unit 455 contains a communications module 456 to realize standard network communications, and a message processing module 468 for implementing the various standard message handling protocols. In addition, memory unit 455 contains a certificate search module 462 for implementing various certificate search strategies according to an aspect of the invention, a message receive module 458, a message transmit module 460, and a key processing and crypto module 464 for performing various cryptographic and key related functions according to an aspect of the invention.

Client Software

Client machine 470 includes standard client computer components, including a network connection device 474, a CPU 472, and a memory unit 475 containing communications module 476 to realize standard network communications. Client software (e.g., message client module 478) running on client machine 470 communicates with secure server 408 through an SHTTP interface provided by communications module 456 running on secure server 408. Communication between message client module 478 on client machine 470 and secure server 408 includes:

1. Uploading/downloading of the user's private key; and
2. Downloading of certain administrator policies from secure server 408 to client machine 470.

Secure server 408 recognizes when a user downloads or sends a message, and whether client machine 470 is running message client module 478 or not. When client machine 470 is running message client module 478, secure server 408 does not decrypt downloaded messages or encrypt messages to be sent since these tasks are performed by message client module 478. For POP and IMAP communications, message client module 478 running on client machine 470 detects when it is communicating with secure server 408 by, for example, either identifying a special string in the server greeting, or by the CAPABILITY command in IMAP.

In order to connect to secure server 408, message client module 478 provides a username and password. Because there are certain times when client machine 470 never sees the user's password (e.g., if his e-mail client uses an MD5 challenge password scheme), when client machine 470 successfully authenticates to secure server 408, secure server 408 provides a small, unique data file to the client (e.g., a cookie), which client machine 470 then later uses to authenticate to secure server 408 without needing the user's password.

Once client machine 470 knows it is communicating with secure server 408, client machine 470 can then send a new command, such as "DONTDECRYPT" or "DONTENCRYPT", which only secure server 408 can interpret.

Secure Sockets Layer (SSL)

An administrative preference specifies whether communications between client machine 470 and secure server 408 over a local communications channel (e.g. local network 490) should use SSL/TLS. Administrative options include: (1) require SSL/TLS, or (2) allow SSL/TLS. In order for this communication to work transparently to the user, the certificate for secure server 408 is installed in the appropriate e-mail client on client machine 470.

A PGP keyring (i.e., the repository for PGP public keys and certificates that exists on any machine that runs the PGP algorithm) resides in memory unit 455 on secure server 408 for use by key processing and crypto module 464, allowing certificates on customers' existing e-mail servers to be verified. In an exemplary embodiment, the PGP software on secure server 408 allows the TLS package from PGP Corporation (known as PGPtls) to be used for the SSL/TLS functions. Additionally, the use of a PGP keyring allows a customer to add additional CA certificates to an X.509 CA keyring, in case the customer is already running its own internal CA.

SMTP (which is the protocol implemented in message processing module 468 and used by secure server 408 for transferring e-mail messages) utilizes two different mechanisms for implementing SSL/TLS. First, a STARTTLS extension (according to the well known RFC3207) is used, which performs a TLS negotiation on port 25 (the "official" method, since it follows RFC3207). Second, an SSL-wrapped SMTP service on port 465 is used (the "unofficial" method, since it does not follow RFC3207). Because there are some client software packages that don't support the STARTTLS extension on port 25 (Ximian Evolution, for example), and there are other clients that don't support the unofficial port 465 SSL-wrapped SMTP (Microsoft Outlook, for example), secure server 408 supports both methods.

The SSL certificate request/retrieval process is an integrated part of the administration console of secure server 408. Prior to generating a certificate, secure server 408 authorizes the customer's license number, license authorization, and DNS name. The administration console of secure server 408 requests the certificate by communicating with a designated authority over SHTTP and attempting to download the certificate immediately. In such an embodiment, no manual intervention is needed to approve the certificate request.

In an exemplary embodiment, SSL certificates are valid for one year from the date of issuance. As discussed in further detail below, when the certificate expiration date nears, key processing and crypto module 464 within secure server 408 automatically renews the certificate. For convenience of the users, new SSL certificates can continue to be provided for as long as the customer license number indicates that the user is licensed to use the product.

Sending E-mail

When secure server 408 receives a message from client machine 470 (in proxy mode) or e-mail server 420 (in gateway mode) over SMTP, this corresponds to sending a message. This is referred to as sending a message because the connection corresponds to some user (a local user or a remote user) sending a message that needs to be secured. Secure server 408 can work with either authenticated connections (e.g., SMTP-AUTH, which is an SMTP service extension in SMTP nomenclature indicating an authentication method to be used by a server) or unauthenticated connections. Authenticated connections are ones that represent users sending e-mail (e.g., a user of client machine 470 sending a message), while unauthenticated connections represent e-mail that is being received for users from, for example, Internet 1000.

In a typical embodiment, a secure server (e.g., secure server 408 in FIG. 4) uses SMTP-AUTH to send e-mail from its own users. The use of SMTP-AUTH is a common mechanism to avoid a server being used as an open relay. This permits secure server 408 to recognize when secure server 408 is proxying one of its own users and act appropriately. Message transmit module 460 can, for example, edit the user's certificate with their preferred name by reading it in the FROM line of authorized e-mail. Similarly, the server can set user-specific preferences by using SMTP-AUTH (or a POP/IMAP connect) as a way to authenticate the user.

Figure 5:
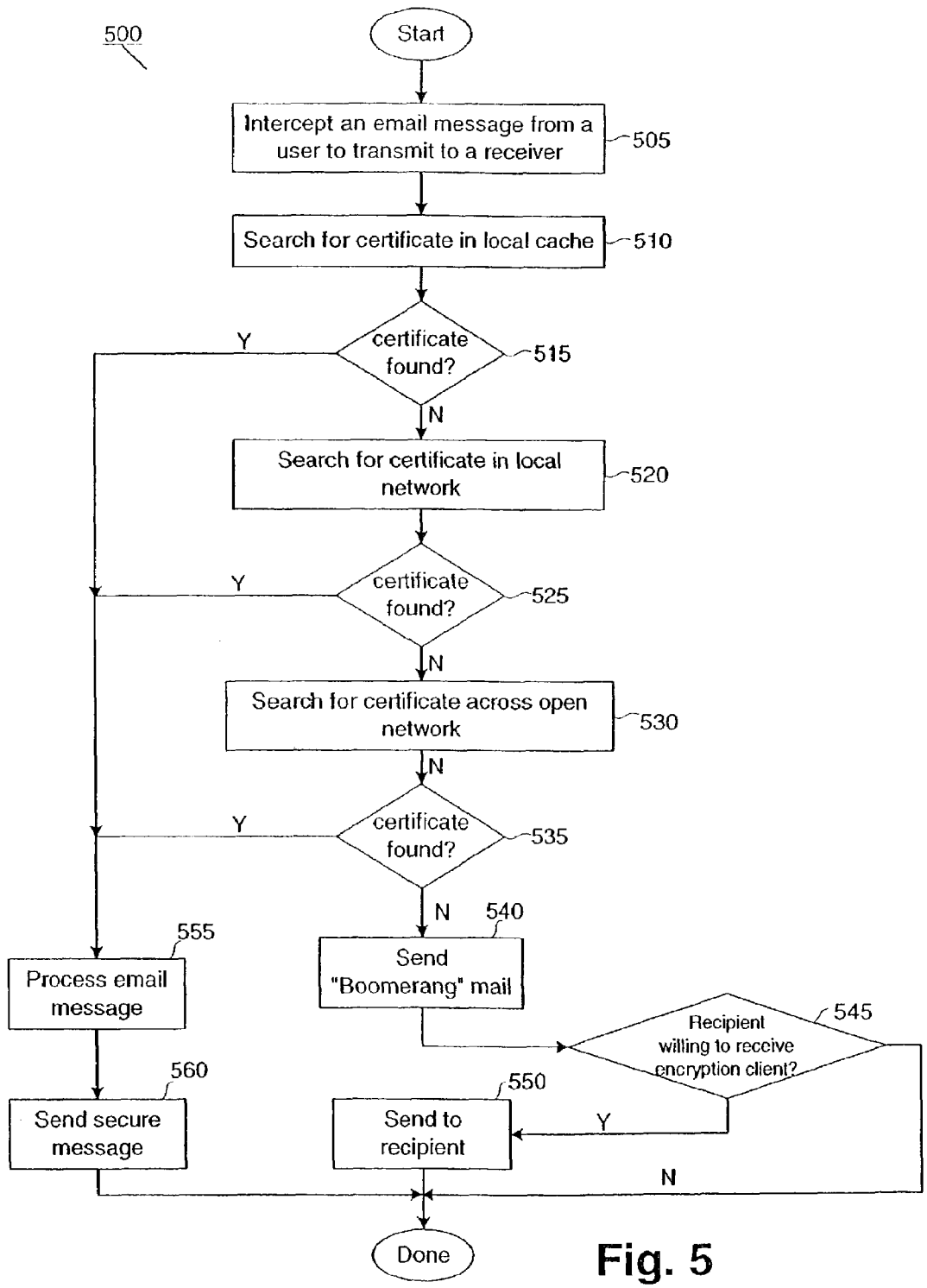
FIG. 5 is a flowchart depicting the process of sending a secure e-mail, according to an embodiment of the present invention.

FIG. 5 illustrates a process used in an embodiment of a secure server according to the present invention for securely transmitting e-mail messages from one user to another. Such a process could, for example, be executed amongst a number of modules shown in memory unit 455 of secure server 408 in FIG. 4. In a step 505 of process 500, a message is intercepted from a user that is to be transmitted to a receiver. Such a message could be, for example, an e-mail message or an instant message. Once intercepted, a determination is made of whether a certificate for the recipient of the message can be located. In a step 510, a search for the certificate of the intended recipient is performed in a local cache. If the certificate is found, control passes at a step 515 to a step 555, where the outgoing e-mail message is processed using the recipient's certificate from the local cache.

If the certificate is not found in the local cache, the local network is searched in a step 520. Again, if the certificate is found somewhere within the local network, control passes at a step 525 to a step 555. If the certificate is not found in the local network, a search is performed of the entire network in a step 530. If the certificate is found within the local network, control passes at a step 535 to a step 555. If not found on the entire network, a secure message URL (e.g., a Boomerang message) is sent to the recipient in a step 540. This allows the recipient to receive a piece of software that provides the ability to exchange secure messages (e.g., via an encryption client from PGP Corporation or some other type of client-side protection software). If the recipient is willing to receive such a client software package (as determined in a step 545), the client software is sent to the recipient in a step 550.

Certificate Search

An important part of sending secure e-mail is retrieving the certificate of the intended recipient. A certificate is a data object that contains one or more public keys, along with any combination of (a) data about the holder of those keys, and (b) one or more signatures binding some subset of the data about the holder of the keys with some subset of the public keys themselves. The data about the holder of the keys can include, for example, the name of they key holder, the key holder's e-mail address, a picture of the key holder, and some indication of the authorization of that key holder.

Referring back to FIG. 4, certificate search module 462 within secure server 408 has particular mechanisms for finding an appropriate certificate to use. The first consideration in such a search is the level of trust to be placed in a certificate. This is determined, in part, via trust policies, as discussed in further detail below.

When looking for an appropriate certificate, a secure server might find it in a number of places including:
1) A local cache of certificates.
2) A local certificate database (e.g., a local public Lightweight Directory Access Protocol (LDAP) server).
3) Other secure servers, in particular a server in the Internet domain of the recipient. Secure server 408 can, for example, use DNS mail exchange records (i.e., mail server records for a particular domain) or look for an appropriately named host for a suitable server (e.g., a host named keys.domain).
4) Designated PGP key servers.
5) Public PGP key servers.
6) Other directories that can hold certificates The administrator of secure server 408 can tailor the actual options that secure server 408 might use for certificate searching, as well as the ordering. The search strategies above are among the policies that secure server 408 is configured to follow in one embodiment of the present invention.

In an exemplary embodiment of the first scenario described above, secure server 408 shown in FIG. 4 contains a certificate cache 411. Certificate cache 411 contains a subset of all of the certificates that secure server 408 has utilized. As one example, certificate cache 411 contains a predetermined number of the most recently used certificates. Thus, if a certificate is needed and was used recently, secure server 408 quickly retrieves the certificate from certificate cache 411. In an alternate embodiment, certificate cache 411 contains certificates that are used most frequently. Thus, if a certificate is needed and is one of the most frequently used certificates (as determined, for example, by a frequency-of-use algorithm), it is retrieved quickly from certificate cache 411.

FIG. 4 also shows an example of the second scenario above. Specifically, e-mail server 420 contains an LDAP database 425. LDAP database 425 can contain, for example, the certificates for all users of local network 490. In an alternate embodiment, a separate LDAP server could contain the certificates for all employees of a particular division or company, or the certificates for all members of a particular organization (even if all of those employees or members were not necessarily users of local network 490). Thus, for searches where recipients will often be from a common group, an LDAP or other server that contains an LDAP database can improve the search time for a certificate (when compared to searching over the entire Internet, for example). In another alternative embodiment, secure server 408 could be configured to implement LDAP database 425.

In an example of the third scenario above, a secure server can query another server by using an LDAP lookup, an http request, or a "piggybacked" request on an SMTP request to another secure server. Secure servers provide an SMTP extension for a certificate request. This is how secure servers implement direct trust—when sending e-mail to a user in another domain, a secure server in the sending domain will simply query the e-mail server in the receiving domain for the proper certificate. If the e-mail server in the receiving domain has a certificate for that e-mail address, that certificate is retrieved and used.

A direct trust strategy, as discussed in further detail below, provides two enhancements over previous mechanisms—easy coordination with partner organizations, and a shortcut on the certification problem. For example, two workgroups that install secure servers cause encrypted e-mail to automatically spread through the two organizations. The trust relationship is based on simple cooperation between the two e-mail servers. It can be further enhanced by other network security protocols such as DNSsec and IPsec.

A fourth possibility for searching for the recipient's certificate in an exemplary embodiment includes searching one or more designated PGP key servers. A PGP key server is a server that contains a database of PGP users, their public keys, and certificates. Secure server 408 can contain, in one embodiment, a set of designated PGP key servers as the next entry in its search path for finding a recipient's certificate. The designated PGP key servers could be, for example, located in areas geographically near to where secure server 408 and local network 490 are located, or could be housed at institutions where a significant number of recipients may exist (such as a particular university).

In addition to searching one or more designated PGP key servers, in a fifth scenario secure server 408 can also be configured by policy to search all public PGP servers for the certificate of the designated recipient. A public PGP key server is a PGP key server that can be reached via the Internet by anyone (i.e., certificates within the database of that public PGP key server can be accessed and retrieved by anyone with access to the Internet). One reason for placing this at a lower priority is that a search of all public PGP key servers could take considerably longer than searching a local cache, a local database, other secure servers, or a set of designated PGP key servers.

Finally, secure server 408 could be configured to search one or more other directories for the certificate of the intended recipient of a message from a user. Such other directories could include, for example, custom enterprise directories that contain a particular subset of certificates or nonpublic certificates.

Once a certificate has been found, the certificate is added to the local public certificate cache, to speed up multiple look-ups of the same certificate. Certificates added to the local public certificate cache expire after a time the administrator has configured and are then removed.

If a certificate cannot be located for the intended recipient of a message, secure server 408 provides several alternatives, with the behavior depending on administrative preference. In one embodiment, possible actions can include:

1. Return the message to the original sender
2. Send the message unencrypted
3. Add a "smart trailer" following the unencrypted text of the message, with a URL leading the recipient back to the secure server giving them a link to download an encryption client (e.g., a PGP client) or allowing them to set preferences for using secure URL e-mail.
4. Send a secure URL e-mail message (e.g., a Boomerang e-mail provided by PGP Corporation).

Secure URL E-Mail Message

Secure URL e-mail describes the concept where outbound e-mail that should be encrypted actually stays on secure server 408 and requires the recipient to view the e-mail through an SHTTP web page on secure server 408. Instead of receiving the unencrypted message, in one exemplary embodiment, the recipient receives a message containing a URL pointing back to secure server 408, as well as other URLs for downloading, for example, encryption client software. In an exemplary embodiment, the URL leads the recipient back to an SHTTP web page on secure server 408. The web page, secured with SHTTP, allows the recipient to securely read the message. For example, the web page could contain the following questions followed by the original clear message beneath it (but still secured via the SHTTP connection):

"You may read messages from John Smith <john@ovidbuyer.com> securely in the future. Please select one of the following options:

1. Use encryption to read e-mail securely on your desktop (installs an encryption client when selected)
2. Enter a passphrase to read e-mail from ovidbuyer.com securely on this site
3. Please do not encrypt e-mail to me"

In one embodiment of the present invention, for each e-mail address to which secure server 408 tries to send e-mail, secure server 408 creates a new secure URL e-mail account. This provides a way for secure transparent electronic communication to be enabled by default. Even if a certificate is not found for a particular recipient (as described earlier), the provision of a secure URL e-mail account will mean that communications between the user and the recipient are secure.

Upon a recipient selecting option 2 above, secure server 408 creates a passphrase to the entry for that account in the secure URL e-mail database. Future messages to that recipient are read using this passphrase. By providing a passphrase, a further level of security is added since only the recipient with that passphrase can view messages sent by secure server 408. This provides a rudimentary level of authentication.

If a recipient selects option 3 above, secure server 408 adds a flag to the entry in the secure URL e-mail database so secure server 408 will send that recipient messages in the clear (i.e., unencrypted) but still secured by the SHTTP connection.

Thus, in an embodiment of the present invention, secure URL e-mail provides a form of secure transparent electronic communication, even when the recipient does not have secure communication capability on the recipient's computer or other electronic device. Secure transparent electronic communication causes the communication between the user and the recipient to be secured, regardless of the intent of either the user or the recipient.

Receiving E-mail

When a user retrieves e-mail from secure server 408, the server proxies the connection in message receive module 458 and decrypts messages in key processing and crypto module 458 before they are sent over SSL to the user's system. This process, as directed by the applicable policy, can be completely transparent, or can be enhanced with text or HTML to let the user know that the e-mail was sent encrypted or signed.

Verifying a digital signature on a received e-mail message involves a certificate search similar to one needed for sending e-mail. Verification of a digital signature can also utilize the OpenPGP Preferred Key Server signature subpacket (RFC 2440, section 5.2.3.17) that tells where to find the proper certificate to update the signing certificate's status (such as revocation).

Figure 6:
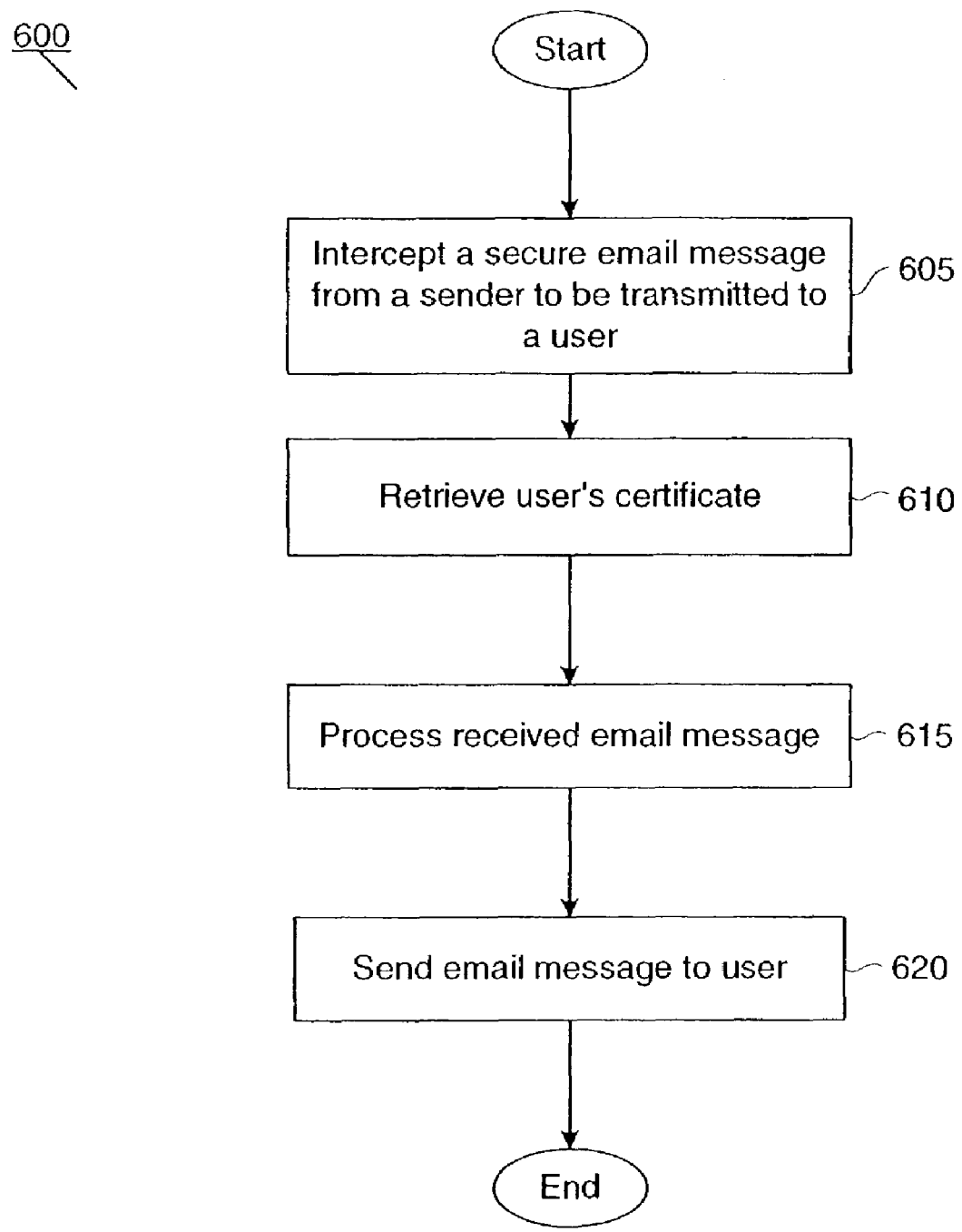
FIG. 6 is a flowchart depicting the process of receiving a secure e-mail, according to an embodiment of the present invention.

FIG. 6 illustrates a process used in an embodiment of a secure server according to the present invention for securely receiving e-mail messages from a user. Such a process could, for example, be executed amongst a number of modules shown in memory unit 455 of secure server 408 in FIG. 4. In a step 605 of process 600, a secure message is intercepted from a user that was sent from another user. Upon receipt of the message, secure server 408 retrieves a user's certificate in a step 610. In a step 615, the received secure message is processed (including, in an embodiment, decryption of the encrypted message). Once processed into readable text, the message can then be sent on the user in a step 620.

Automated PKI

Unlike a traditional PKI, installation of secure server 408 creates a PKI as it is used. Secure server 408 needs little provisioning in such a PKI since secure server 408 relies on the interactions of authorized users with the main e-mail server to determine who its users are. It creates certificates as it discovers users, and also expands its dynamic infrastructure as messages are exchanged with other organizations using either PGP key servers, Lightweight Directory Access Protocol (LDAP) certificate servers, or other secure servers. This further minimizes the need for IT staff to provision secure server 408. Furthermore, this dynamic PKI works with X.509 certificates as well as PGP certificates, and can provide interoperability between PGP and S/MIME based systems.

Key Generation

When a user successfully authenticates to secure server 408 (via the authentication with e-mail server 420 via SMTP, POP, or IMAP), a check is made to determine whether that user has been issued a certificate. If the user does not have a key, secure server 408 generates a new public key pair and certificate using key processing and crypto module 464, and automatically signs the new certificate using a PGP certification key from secure server 408.

To generate the key pair, two pieces of user-specific information are needed: the user's name and e-mail address. In the case of the user sending an SMTP e-mail, both the username and the e-mail address can be read from the "From:" line of the e-mail being sent. In the case of the user receiving e-mail via POP or IMAP, the username is acquired from the name used for authenticating to the system, and the domain is likely already known (although this may not be the case when managing multiple e-mail domains). In addition, for POP and IMAP the e-mail address is determined. There is not a way, however, for determining the real name of the user. To work around this problem, a certificate is generated with just the e-mail address. When the user later authenticates via SMTP, the certificate's self signature is updated with the name taken from the "From:" line of the outbound message.

Local user public keys generated by key processing and crypto module 464 in secure server 408 will have the "group key" flag set in the corresponding certificate (as specified in RFC 2440, section 5.2.3.20), notifying other users that the user's private key is not in the sole possession of the intended recipient. In addition, the "preferred key server" option (as specified in RFC 2440, section 5.2.3.17) is set to the Open LDAP running on secure server 408. In an embodiment, the URL is a standard LDAP URL such as:

ldap://host:port/pgpcertid=1234567890ABCDEF,
ou=PGP Keyspace, o=OrgName

Certificate Updates

Within message processing module 468, additional user IDs can be associated with user certificates in secure server 408, particularly when a user is detected to have one or more alias addresses, such as msmith@company.com and mike.smith@company.com. When a user sends a message with the "From:" header containing an address that is not on his certificate, secure server 408 will add that address.

A more complicated case occurs when a user has multiple aliases, but only ever sends e-mail from one address, e.g., Mike Smith sends e-mail from msmith@company.com, but also receives e-mail for mike@company.com, mike.smith@company.com, etc. In this case, a new header (such as "X-Ovid-Recipient" in an embodiment of the present invention involving an Ovid server) is added by message processing module 468 to all incoming non-mailing list e-mail (i.e., individually addressed e-mail) received by secure server 408. The new header contains the actual SMTP recipient address (i.e., the address specified in the RCPT command in the SMTP session). When the user downloads e-mail, secure server 408 compares the recipient address added to the X-Ovid-Recipient header with the authenticated username. If the recipient address is different from the username, secure server 408 associates the recipient address with the user's certificate as a new user ID.

All internal mailing lists within e-mail server 420 are added to an exclusion list. In an embodiment, messages sent to mailing lists will not have the X-Ovid-Recipient header added to them, nor will they have this header checked when downloaded. If a mailing list fails to get added to the exclusion list, an e-mail sent by a non-local user to an internally-hosted mailing list (e.g., list@company.com), would cause the header "X-Ovid-Recipient: list@company.com" to be added to the SMTP message when it was first received. When the recipient downloads the message, secure server 408 would process the X-Ovid-Recipient header and add list@company.com to the user's certificate. A mailing list detection mechanism within message receive module 458 in secure server 408 detects and prevents this situation when a user downloads a message.

Note that in gateway mode, the e-mail does not get processed by secure server 408 when the user downloads it, so it only adds aliases when a user sends a message from a different address.

Certificate Expiration and Renewal

Certificates generated by key processing and crypto module 464 in secure server 408 have an expiration time configurable by the administrator, in one embodiment ranging from one day up to no expiration. A default expiration is set, which, in an exemplary embodiment, is two weeks. When a certificate maintenance function within key processing and crypto module 468 of secure server 408 determines that a certificate is nearing expiration, a new certificate with a new self signature for the certificate and a new expiration date is generated (instead of leaving the existing certificate expired and generating a new certificate for the user). This allows a user to retain the same cryptographic key, but with a new expiration date and new signature in the certificate.

In order to solve the "dead certificate" problem (i.e., expired certificates being retained indefinitely), three configurable timeout intervals exist in an embodiment of the present invention:

1. Certificate expiration timeout
2. Account inactivity timeout
3. Final account inactivity timeout The first timeout, the certificate expiration timeout, is the default certificate expiration time. When a certificate maintenance function described above finds any certificates that are expired, or will expire within a predetermined amount of time, secure server 408 checks the last time the user has logged in to e-mail server 420. If the user has logged in within the time period specified by the account inactivity timeout (the second timeout interval), a new self signature is generated for the certificate with a new expiration date. If the user hasn't logged in within the account inactivity timeout, the certificate is left to expire. Once the final account inactivity timeout has elapsed, if the user still hasn't logged in, the certificate is removed. In order to avoid removing certificates for users that may be gone for an extended period of time, the final account inactivity timeout should be set very high.

Trust Policies

There are three basic trust policies that specify certificate validity. They are hierarchical trust, cumulative trust, and direct trust. The server providing secure transparent electronic communication uses all three policies. Hierarchical trust considers a certificate valid if it is certified by some trusted root authority or one of its designated authorities. A trusted root authority can include, for example, a Certification Authority (CA). Traditional X.509 certificates or PGP Meta-Introducers are examples of mechanisms found in hierarchical trust systems. Cumulative trust considers a certificate valid by summing its certifications, weighting those certifications, and checking to see if they are greater than some threshold. The PGP Web of Trust is a cumulative trust system. Direct trust considers a certificate valid if it was received directly from its owner or the secure server used by the owner of the certificate. Typically, individuals use direct trust. In such a system, if a person considers a certificate to be valid because its fingerprint is printed on the business card of the holder of the certificate, the recipient is using direct trust.

Secure server 408 allows its administrators to specify certificates of root authorities for hierarchical trust, and weighted certificates for cumulative trust. For example, in one embodiment the administrator can upload a normal PGP public keyring file (having a .pkr extension) with all of the appropriate keys, certificates, signatures, and trust levels for the organization. Secure server 408 can also use direct trust. It does this by searching for a certificate from the recipient's domain, and making the assumption that if the domain to which the user was going to send plaintext has spoofed a certificate, then it's not substantially worse than sending plaintext. Secure server 408 will thus use direct trust whenever it has received a certificate from a source having a direct relationship with the recipient. In an embodiment, a certificate is directly trusted when it comes from one of the following sources:

1. An LDAP server running at keys.domain.com, where domain.com is the recipient's domain.
2. An LDAP server running on the recipient's SMTP server.

Policies

Policies define the set of rules that govern how a secure server operates in various situations. In an embodiment, the server providing secure transparent electronic communication includes configurable policy elements, such as:

Requirements on encrypting and/or signing within domains
Search strategies
Trusted certificates and servers
No-certificate strategies
Certificate management policies
E-mail display policies
Backup frequency, delivery, etc.
Administrator username
Administrator password
Global enable/disable encryption (learn mode)
Key generation options:
   Key size
   Key algorithm
   Expiration time—range from 1 day to no expiration, default two weeks
Account inactivity timeout—default 1 week
Final account inactivity timeout—default 4 months
Whether communication with local users requires SSL/TLS or not
What to do with a message if the recipient's certificate cannot be found—this should be configurable on a per-domain basis:
   Send in the clear
   Don't send message
   Add smart trailer
   Send a secure URL e-mail message
When to sign a message
   Always
   Never
   When also encrypting
What keys/certificates should be trusted by the secure server
Add/remove per-domain and public keyservers to search for public keys
How long to cache looked up public keys—default 24 hours
Global exclusion list—addresses not to encrypt to
Whether users are allowed to add per-user exclusions for mailing lists
Number of users required to add an address to the global exclusion list
When to decrypt messages—when the secure server receives them, or when user downloads them
Policies for the secure server clients:
   If the secure server clients should give their private keys to the secure server
   Passphrase length
   Passphrase quality
   Key generation options (see above)
   Per-domain and public keyservers to search for public keys and certificates
   Require encryption or allow clear messages when recipient certificate cannot be found
Exchange server TLS certificates
Appliance network configuration—IP address, subnet, DNS name
List of e-mail domains we manage
Addresses of real e-mail servers:
   Incoming SMTP server to receive e-mail
   SMTP relay for outbound e-mail
   POP server
   IMAP server
   Exchange server address and port for communication
Boomerang e-mail account expiration
Boomerang e-mail storage quotas
Allow boomerang recipients to select the option to not encrypt e-mail to them
Administrator PGP key for encrypting the database backups to
FTP server to upload backups to:

Server address
Login information
Directory for backup files
How many backups to keep
How often to backup:
  Which days of the week
  What time to begin backup
Whether to send an e-mail alert to the admin after successful backup, and where to send alert
Whether to automatically install software updates, or save them for the administrator to manually install
A field for the administrator to provide an ssh public key for shell access to the appliance
List of other machines to send syslog messages
E-mail address to e-mail daily logs In an embodiment of the present invention, the administration console also allows the administrator to perform the following tasks:

Search the local certificate databases and revoke or delete individual keys and certificates
View the list of downloaded software updates and install them manually
Request SSL/TLS certificates from our CA
Manage the Boomerang e-mail accounts
View the list of database backups stored on the secure server and download selected backups
Manually start a database backup
Manually clear the local public certificate cache
Manage the local outbound e-mail queue
View the current secure server logs
How to format downloaded e-mail—always plain text, always html, or based on the type of the original message
Exclusion list—addresses not to encrypt to
secure server TLS certificates
secure server address and port for communication Installation In an exemplary embodiment, secure server 408 utilizes a modified Linux operating system, such as the RedHat 7.3 Linux distribution, made by Red Hat, Inc. of Raleigh, N.C. RedHat already provides many extra libraries and applications needed for secure server 408, such as openldap and apache. In a different embodiment, another RedHat-based distribution could be used, such as Immunix. The versatile and modular design of the secure server software allows for easy porting to other Unix-based operating systems, and also to a Windows-based architecture, if needed.

The programs/libraries for secure server 408 are packaged as standard signed RPMs. An RPM is a package written to comply with the RedHat Package Manager. This allows for easy inclusion into the RedHat installer, and simplifies the automatic update mechanism. One distribution of secure server 408 will include some of the RedHat RPM packages, as appropriately modified, with whatever default configurations are needed. By not including unneeded packages, the entire distribution fits onto a single installation CD.

Initial Setup

In order to ease the transition to use of secure servers to provide secure transparent electronic communication, a "Learn Mode" exists in an embodiment of secure server 408. In this mode, secure server 408 does not perform any encryption/decryption, but POP, INAP, and SMTP messages would still be proxied to e-mail server 420, allowing a public key infrastructure (PKI) to be constructed and exclusion lists to be built.

In an embodiment, software updates to secure server 408 are provided over the network automatically. These updates are signed so that only legitimate updates are installed on secure server 408. Automatic updates are distributed as signed RPMs, which is facilitated by the fact that RPM already allows for embedded PGP signatures.

In an exemplary embodiment, secure server 408 has a scheduled task (such as a Unix 'cron' job) to periodically download updated RPMs, verify the PGP signatures, and either (1) automatically install them for the administrator, or (2) notify the administrator by e-mail and allow the installation to be initiated manually from the administration web console. Access to the updated packages is restricted to verified customers. An SHTTP server is maintained which requires the customer to provide a valid license number and license authorization. Using standard RPMs also allows externally provided security updates to be made to any other packages used in secure server 408.

While the above-described embodiment focuses on e-mail, there are a number of other protocols that closely relate to users' needs, including, for example, instant messaging. Instant messaging protocols are widely used and are the fastest growing type of Internet communications. Also, they are completely unsecured. Secure server proxies can provide security to these protocols.

Set forth in detail above are aspects of at least one embodiment of the present invention. Each of the features set forth above may be implemented in one system, method, and/or computer executable code in accordance with an embodiment of the present invention. Alternatively, each of the features set forth above may be separately implemented in different systems, methods, and/or computer executable codes in accordance with embodiments of the present invention.

Furthermore, the principles, preferred embodiments, and modes of operation of the present invention have been described in the foregoing description. However, the invention that is intended to be protected is not to be construed as limited to the particular embodiments disclosed. Further, the embodiments described herein are to be regarded as illustrative rather than restrictive. Others may make variations and changes, and equivalents employed, without departing from the spirit of the present invention. Accordingly, it is expressly intended that all such variations, changes and equivalents which fall within the spirit and scope of the present invention as defined in the foregoing claims be embraced thereby.

What is claimed is:

1. A method comprising:
    intercepting, at a secure server, an unencrypted message from a sender;
    searching a sequence of resources for a public key corresponding to a recipient of said unencrypted message according to a predetermined trust policy that specifies the sequence of resources as a hierarchy of networked resources on networked machines connected to said secure server including a local cache, a local certificate database, a recipient domain server and a designated key server;
    when said public key is found, encrypting said unencrypted message using said public key to create a secure message created during an encryption-operation; and
    transmitting said secure message to said recipient;
    wherein said secure server transparently locates said public key and transmits said secure message to said recipient without input from said recipient during said encryption phase operation and' without said sender specifying that said secure message be transmitted; and
    wherein said secure server further comprises a module to identify that a user has established a first authentication connection with an electronic mail server and automatically creates a certificate for the user in response to the first authenticated connection with the electronic mail server.

2. A system comprising:

a server, further comprising:

a message receive module for receiving an unencrypted message from a sender;

a public key certificate search module to locate a digital identity corresponding to a recipient of said unencrypted message according to a predetermined trust policy that specifies the sequence of resources as a hierarchy of networked resources on networked machines connected to said secure server including a local cache, a local certificate database, a recipient domain server and a designated key server;

a crypto module for encrypting said unencrypted message using a public key for said recipient from said digital identity identified by said certificate search module to create a secure message created during an encryption operation; and a message transmit module for transmitting said secure message to said recipient;

wherein said server transparently locates said stored digital identity and transmits said secure message to said recipient without input from said recipient during said encryption phase operation and without said sender specifying that said secure message be transmitted, and wherein said server further comprises a module to identify that a user has established a first authentication connection with an electronic mail server and automatically creates a certificate for the user in response to the first authenticated connection with the electronic mail server.

* * * * *